United States Patent [19]

Kirchmeyer et al.

[11] Patent Number: 5,688,863

[45] Date of Patent: Nov. 18, 1997

[54] SOFT THERMOPLASTIC POLYURETHANE UREAS A PROCESS FOR THEIR PREPARATION AND THEIR USE

[75] Inventors: Stephan Kirchmeyer, Leverkusen; Hanns-Peter Müller, Odenthal; Hans-Georg Wussow, Düsseldorf; Bodo Rehbold, Köln, all of Germany

[73] Assignee: Bayer Aktiengesellschaft, Leverkusen, Germany

[21] Appl. No.: 583,262

[22] Filed: Jan. 5, 1996

Related U.S. Application Data

[63] Continuation-in-part of Ser. No. 312,356, Sep. 26, 1994, abandoned.

[30] Foreign Application Priority Data

Oct. 4, 1993 [DE] Germany .................. 43 33 776.7

[51] Int. Cl.$^6$ .................. C08L 75/06; C08L 75/08; C08L 75/10
[52] U.S. Cl. .................. 524/839; 524/840; 524/323; 524/342; 524/345; 524/356; 524/361; 524/364
[58] Field of Search .................. 524/839, 840, 524/323, 342, 345, 356, 361, 364

[56] References Cited

U.S. PATENT DOCUMENTS

| | | | |
|---|---|---|---|
| 4,049,632 | 9/1977 | Magnusson et al. | 260/75 NE |
| 4,055,549 | 10/1977 | Roberts | 260/77.5 AN |
| 4,062,834 | 12/1977 | Gilding et al. | 260/77.5 AA |
| 4,286,080 | 8/1981 | Quirling et al. | 525/425 |
| 4,321,173 | 3/1982 | Schuhmacher et al. | 525/453 |
| 4,921,842 | 5/1990 | Henning et al. | 524/839 |

FOREIGN PATENT DOCUMENTS 4039151  6/1992  Germany .

*Primary Examiner*—W. Robinson H. Clark
*Attorney, Agent, or Firm*—Joseph C. Gil; Aron Preis

[57] ABSTRACT

A thermoplastic polyurethane urea prepared by reacting a reaction mixture of a) one or more polyisocyanates, with
b) one or more compounds having on average at least 1.8 Zerewitinoff-active hydrogen atoms and a molecular weight of between 400 and 10,000, and
c) water, wherein the water is introduced into the reaction mixture with the aid of an effective quantity of one or more emulsifiers. The reaction mixture may additionally contain d) further conventional auxiliary substances and additives.

4 Claims, No Drawings

SOFT THERMOPLASTIC POLYURETHANE UREAS A PROCESS FOR THEIR PREPARATION AND THEIR USE

This application is a Continuation-In-Part of application Ser. No. 08/312,356, filed Sep. 26, 1994, now abandoned.

BACKGROUND OF THE INVENTION

Polyurethane ureas made from isocyanate-containing prepolymers and water are described in U.S. Pat. Nos. 4,049,632 and 4,062,834. These polyurethane ureas can, however, be prepared only from certain starting materials, exclusively in discontinuous processes and with the aid of relatively expensive processing procedures. According to U.S. Pat. No. 4,062,834, the polyurethane ureas are prepared by reaction of a prepolymer from a hydroxyfunctional polyoxytetramethylene and 4,4'-diphenylmethane diisocyanate in solution and are subsequently precipitated. This preparation method is also unsuitable for industrial use due to the large quantities of solvents required.

Thermoplastically processable polyurethanes and the discontinuous preparation thereof from tolylene diisocyanate, poly-caprolactonediol, an essential low-molecular weight glycol and water are described in U.S. Pat. No. 4,055,549. But according to U.S. Pat. No. 4,055,549, it is not possible to use water without a further diol chain extender in addition to water. This is however disadvantageous, because in general worse mechanical and thermal properties are obtained with mixed chain extenders than when only one chain extender is used. The continuous preparation process, particularly using multishaft screw extruders, is not mentioned.

According to European Patent Application 21,323, polyurethane ureas can be prepared in multishaft screw extruders, wherein the water is introduced into the screw extruder at a point where the reaction mixture is at a temperature of preferably 170° to 270° C., such that a steam pressure of at least 10 bar builds up in the extrusion zone. The problems of this process are the high pressure of steam required for the reaction, and the high reaction temperatures necessary for the preparation. On one side, the steam must be prevented from escaping from the screw extruder by a particular temperature profile. On the other, the high reaction temperatures necessary for this temperature profile cause damage to the polymer, because the polyurethane group readily undergoes decomposition at temperatures of above 180° C.

The object of the present invention was to make available a polyurethane urea having outstanding mechanical and thermal properties, and at the same time an improved method of preparation wherein it is immaterial whether the polyurethane ureas are prepared discontinuously or continuously, that is, for example, with the use of screw extruders.

Surprisingly it was then found that thermoplastic polyurethane ureas obtainable by the reaction (optionally in stages) of a polyisocyanate component, with a component composed of one or more compounds having on average at least 1.8 Zerewitinoff-active hydrogen atoms and a molecular weight of between 400 and 10,000, water, and optionally other conventional auxiliary substances and additives, can not only be prepared advantageously, but also exhibit particularly good mechanical and thermal properties, when the water required for the reaction is introduced into the reaction mixture in combination with an emulsifier. This is especially surprising and not foreseeable by the person skilled in the art, since according to the current opinion of persons skilled in the art, polyurethane ureas which have been prepared at initial temperatures of less than 100° C. exhibit a disadvantageous distribution of polyurea segments and soft polyurethane segments (see European Patent Application 21,323 at page 2, lines 15 to 18). The products are described as less homogeneous, containing gel particles and at the identical formulation more turbid and less soluble (see European Patent 21,323 at page 26, lines 25 to 28).

This is surprisingly not the case. The polyurethane ureas according to the invention can be prepared discontinuously as well as continuously, for example, in a multishaft screw extruder. In particular, at initial temperatures of less than 100° C., totally homogeneous, readily soluble polyurethane ureas that are free of gel particles are obtained which have outstanding mechanical and thermal properties. They are, moreover, thermoplastically processable.

DESCRIPTION OF THE INVENTION

The present invention relates to a process for preparing a thermoplastic polyurethane urea having a solid content greater than 60%, preferably at least 70%, more preferably at least 90% by weight, prepared by reacting a reaction mixture comprising:

a) one or more polyisocyanates, with b) one or more organic compounds having on average at least 1.8 Zerewitinoff-active hydrogen atoms and a molecular weight of between 400 and 10,000, and c) water wherein the water is introduced into the reaction mixture with the aid of an effective quantity of one or more emulsifiers.

It is possible that the reaction mixture additionally comprises:

d) additional conventional auxiliary substances and additives. The components may be reacted in one step, or in several steps.

The present invention also relates to a process for the preparation of thermoplastic polyurethane ureas by reacting a reaction mixture comprising:

a) one or more polyisocyanates, b) one or more organic compounds having on average at least 1.8 Zerewitinoff-active hydrogen atoms and a molecular weight of between 400 and 10,000, and c) water wherein the water is introduced into the reaction mixture with the aid of an effective quantity of one or more emulsifiers.

The reaction mixture used in the process may additionally comprise: d) conventional auxiliary substances and additives.

This process can be either a discontinuous process or a continuous process.

The polyurethane urea prepared according to the present invention is suitable for the production of molded articles, moldings, injection-molded parts, thermoformed parts, semi-finished goods, plates, containers, equipment parts, casings, rollers, gearwheels, machine and vehicle parts, cylinders, elastic coatings, films, housings, flexible tubing, catheters, seals, profiles, bearing shells and fibers.

Suitable compounds which may be used as component a) include, for example, aliphatic, cycloaliphatic, araliphatic, aromatic and heterocyclic polyisocyanates, or any mixtures of these polyisocyanates which are described, for example, in HOUBEN-WEYL "Methoden der organischen Chemie", volume E20 "Makromolekulare Stoffe", Editors: H. Bartl, J. Falbe, Georg Thieme Verlag, Stuttgart, N.Y., 1987, pages 1587 to 1593. These include, for example, ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3-and cyclohexane-1,4diisocyanate and any mixtures of these isomers, 1-isocyanato-3,3,5-trimethyl-5-isocyanatomethyl-cyclohexane, 2,4- and 2,6-hexahydrotolylene diisocyanate and any mixtures of these isomers, hexahydro-1,3- and/or-1,4-phenylene diisocyanate, perhydro-2,4'- and/or -4,4'-diphenylmethane diisocyanate, norbornane diisocyanate (as described in, for example, U.S. Pat. No. 3,492,330), 1,3- and 1,4-phenylene diisocyanate, 2,4- and 2,6-tolylene diisocyanate and any mixtures of these isomers, diphenylmethane -2,4'- and/or -4-4'-diisocyanate.

According to the invention, aromatic, aliphatic, and/or cycloaliphatic diisocyanates are preferred. In particular, the preferred aromatic diisocyanates include, for example, the optionally alkyl-substituted tolylene- and diphenylmethane diisocyanates. Preferred aliphatic diisocyanates include, for example, hexamethylene diisocyanate; and preferred cycloaliphatic diisocyanates include compounds such as, for example, 1-isocyanato-3,3,5-trimethyl-5-isocyanato-methylcyclohexane, perhydro-2,4'- and/or-4,4'-diphenylmethane diisocyanate.

It is also possible to use higher functional isocyanates such as, for example, triphenylmethane-4,4',4"-triisocyanate, polyphenyl polymethylene polyisocyanates obtained by aniline-formaldehyde condensation and subsequent phosgenation as well as the distillation residues possessing isocyanate groups which are formed in the technical production of isocyanates, optionally in one or more of the aforementioned polyisocyanates. However, care must be taken to ensure that an average functionality of two is not appreciably exceeded, if the polyurethane ureas are to be processed thermoplastically or from solution. It is possible to use isocyanate reactants having a higher functionality, provided that an overall functionality of two for the isocyanate component is not appreciably exceeded. The use of higher functionality isocyanate reactants can be compensated for by the concomitant use of other isocyanate reactants having a functionality of lower than two.

Monofunctional isocyanates suitable for this purpose include, for example, stearyl isocyanate, cyclohexyl isocyanate and phenyl isocyanate.

Suitable starting materials for use as component b) include, for example, organic compounds having on average at least 1.8 Zerewitinoff-active hydrogen atoms and a molecular weight of between 400 and 10,000. In addition to compounds containing, for example, amino groups, thiol groups or carboxyl groups, these are understood to include, in particular, compounds having two to eight hydroxyl groups, especially those having a molecular weight of from 450 to 6000, preferably of from 600 to 4500. These include, for example, polyesters, polyethers, polycarbonates and polyester amides having hydroxyl groups.

The suitable polyesters include, for example, reaction products of polyvalent, preferably divalent, and optionally, in addition, trivalent alcohols with polyvalent, preferably divalent carboxylic acids and derivatives thereof that are capable of esterification. The polycarboxylic acids may be of aliphatic, cycloaliphatic, aromatic and/or heterocyclic nature including, for example, those substituted by halogen atoms and/or unsaturated.

Examples of such carboxylic acids and derivatives thereof which may be named include succinic acid, adipic acid, phthalic acid, isophthalic acid, phthalic anhydride, tetrahydrophthalic anhydride, hexahydrophthalic anhydride, tetrachlorophthalic anhydride, endomethylene tetrahydrophthalic anhydride, maleic acid, maleic anhydride, fumaric acid, dimerized and trimerized unsaturated fatty acids, and, optionally, in mixtures with monomeric unsaturated fatty acids, terephthalic dimethyl ester and terephthalic bisglycol ester.

Suitable polyvalent alcohols include, for example, ethylene glycol, propylene glycol-(1,2) and -(1,3), butylene glycol-(1,4) and -(2,3), hexanediol-(1,6), octanediol-(1,8), neopentyl glycol, 1,4-bis(hydroxy-methyl)-cyclohexane, trimethylolpropane, trimethylolethane, also di-, tri-, tetra- and higher polyethylene glycols, di- and higher polypropylene glycols and di- and higher polybutylene glycols. The polyesters may have proportionately terminal carboxyl groups. Polyesters of lactones such as, for example, ε-caprolactam, or of hydroxycarboxylic acids such as, for example, ω-hydroxyhexanoic acid, may also be used. The hydroxy-functional polyesters known from fat chemistry such as, for example, castor oil and the transesterification products thereof, may however also be used.

The suitable polyethers include those of the kind known per se and are generally prepared, for example, by polymerization of epoxides such as, for example, ethylene oxide, propylene oxide, butylene oxide, styrene oxide or epichlorohydrin, or of tetrahydrofuran on their own, for example, in the presence of Lewis-catalysts such as boron trifluoride, or by addition of the epoxides, with ethylene oxide and propylene oxide being preferred, and optionally mixed or in succession, to starting components having hydrogen atoms capable of reacting, such as, for example, water, alcohols, ammonia or amines including, for example, ethylene glycol, propylene glycol-(1,3) or-(1,2), water, 4,4'-dihydroxy-phenylpropane, aniline, ethanolamine or ethylenediamine. Polybutadienes containing hydroxyl groups are also suitable.

Suitable polycarbonates having hydroxyl groups include those of the kind known per se, and which may be prepared, for example, by reacting diols such as, for example, propanediol-(1,3), butanediol-(1,4) and/or hexanediol-(1,6), diethylene glycol, triethylene glycol, tetraethylene glycol or thiodiglycol with diaryl carbonates such as, for example, diphenyl carbonate, or phosgene (as described in DE 1,694, 080 and 2,221,751, the disclosures of which are herein incorporated by reference).

The polyester amides and polyamides include, for example, the predominantly linear condensates obtained, for example, from polyvalent saturated or unsaturated carboxylic acids or anhydrides thereof and polyvalent saturated or unsaturated amino alcohols, diamines, poly-amines and mixtures thereof.

Also suitable are polyhydroxyl compounds wherein high-molecular polyadducts or polycondensates or polymerisates are contained in finely-dispersed, dissolved or graft form. Modified polyhydroxyl compounds of this kind can be obtained, for example, when polyaddition reactions (such as, for example, reactions between polyisocyanates and amino functional compounds) or polycondensation reactions (such as, for example, between formaldehyde and phenols and/or amines) are conducted in situ in the compounds having hydroxyl groups. Processes of this kind are described, for instance, in DE 1,168,075 and 1,126,142, as well as DE 2,324,134, 2,423,984, 2,512,385, 2,513,815, 2,220,796, 2,550,797, 2,550,833, 2,550,862, 2,633,293 and 2,639,254, the disclosures of which are herein incorporated by reference. It is however also possible, according to U.S. Pat. No.

3,869,413 and DE 2,550,860, the disclosures of which are herein incorporated by reference, to mix a finished aqueous polymer dispersion with a polyhydroxyl compound and then to remove water from the mixture.

Polyhydroxyl compounds modified by vinyl polymerization, which are obtained, for example, by polymerization of styrene and acrylonitrile in the presence of polyethers (as described in U.S. Pat. No. 3,383,351, 3,323, 093, 3,110,695, and DE 1,152,536, the disclosures of which are herein incorporated by reference) or polycarbonate polyols (as described in DE 1,769,795, U.S. Pat. No. 3,673,909, the disclosures of which are herein incorporated by reference) are also suitable.

Mixtures of the aforementioned compounds having at least two hydrogen atoms that are capable of reacting with isocyanates and a molecular weight of from 400 to 10,000 such as, for example, mixtures of polyethers and polyesters, may as a matter of course be used.

Also, suitable compounds include, for example, polyether polyamines having terminal aromatic primary amino groups, which are obtainable, for example, by the processes described in EP 79,536, DE 2,948,419, DE 2,019,432, DE 2,619,840, and U.S. Pat. Nos. 3,808,250, 3,975,426 and 4,016,143, the disclosures of which are herein incorporated by reference, as well as polyethylene glycols and/or polypropylene glycols having terminal aliphatic amino groups and being optionally branched.

Examples of the said compounds to be used according to the invention include those described, for example, in *High Polymers;* Volume XVI, "Polyurethanes, Chemistry and Technology", by Saunders and Frisch, Interscience Publishers, New York, London, Volume I, 1962, pages 32 and 42 and pages 44 to 54 and Volume II, 1964, pages 5 to 6 and 198 to 199, and in *Kunststoff-Handbuch* Volume VII, edited by Vieweg and Hochtlen, Carl-Hanser-Verlag, Munich, 1966, for example, on pages 45 to 71.

Any mixtures of the compounds described above having at least 1.8 hydrogen atoms capable of reacting with isocyanate and a molecular weight of from 400 to 10,000 such as, for example, mixtures of polyethers and polyesters, may also be used as component b).

Smaller quantities of compounds having at least two hydrogen atoms capable of reacting with isocyanates and a molecular weight of from 32 to 400 may also optionally be used in component d) in the reaction mixture. Monofunctional compounds in component d) may be present in proportions of up to 10% by weight, based on the weight of the reaction mixture. Such compounds act as so-called chain stoppers. These monofunctional compounds incluse, for example, monoamines such as, for example, butylamine and dibutylamine, octylamine, stearylamine, N-methylstearylamine, pyrrolidine, piperidine and cyclohexylamine; and monoalcohols such as, for example, butanol, 2-ethylhexanol, octanol, dodecanol, the various amyl alcohols, cyclohexanol and ethylene glycol monomethyl ether.

Bi- or polyfunctional compounds in component d) may be used according to the invention in a quantity such that the equivalent ratio of these compounds to the equivalent ration of the component c) is 1:1 at the most. The equivalent ratio is preferably 0.5:1 at the most. It is particularly preferred that no further compounds having at least two hydrogen atoms capable of reacting with isocyanates and a molecular weight of from 32 to 400 to be used.

Some examples of such compounds include diols and polyols such as, for example, ethylene glycol, propylene glycol-(1,2) and -(1,3), butylene glycol-(1,4) and -(2,3), pentanediol-(1,5), hexanediol-(1,6), octanediol-(1,8), neopentyl glycol, 1,4-bis(hydroxymethyl)cyclohexane, 2-methyl-1,3-propanediol, glycerol, trimethylolpropane, hexanetriol-(1,2,6), trimethylolethane and pentaerythritol, di-, tri, tetra- and higher polyethylene glycols having a molecular weight of up to 400, as well as di- and higher polypropylene glycols having a molecular weight of up to 400, 4,4'-dihydroxydiphenylpropane, di(hydroxymethyl)-hydroquinone, ethanolamine, diethanolamine, N-methyldiethanolamine, triethanolamine and 3-aminopropanol; aliphatic diamines such as, for example, ethylene-diamine, 1,4-tetramethylenediamine, hexamethylenediamine and mixtures thereof, 1-amino-3,3,5-trimethyl-5-aminomethylcyclohexane ("isophorone-diamine"), 2, 4, - and 2,6-hexahydrotolylenediamine and mixtures thereof, perhydro-2,4'- and 4,4'-diaminodiphenylmethane, p-xylylenediamine and bis-(3-aminopropyl)methylamine; hydrazine and substituted hydrazines such as, for example, methylhydrazine and N,N'-dimethylhydrazine; and aromatic diamines including, for example, bisanthranilate, 3,5- and 2,4-diamino-benzoate, 3,3'-dichloro-4,4'-diaminodiphenylmethane, tolylene-diamine and 4,4'-diamino-diphenylmethane.

The compounds of component b), c) and d) that are reactive towards isocyanate are generally selected so that the average functionality of two is not appreciably exceeded, if polyurethane ureas are to be prepared which can be processed thermoplastically or from solution. Higher functional compounds are, therefore, to be compensated by the concomitant use of the aforesaid monofunctional starting components.

According to the invention the water c) may be introduced into the reaction, for example, in the form of water of crystallization or water bound by adsorption. The preferred quantity of water to be used according to the invention is at least 100% of the theoretically calculated value. But optionally, it may also be appropriate to use 800 or even more than 5000% of the theoretically calculated quantity. The theoretically usable quantity is calculated from the difluence between isocyanate groups of component a) and the Zerewitinoff-active hydrogen atoms of component b), c) and d). These calculations are known and can be done by anyone of ordinary skill in the art. But, optionally, it may also be appropriate to use 800 to 5000% of the theoretically calculated amount of water. The theoretically calculated amount of water may be determined from the difference between isocyanate groups of components a) and the Zerewitinoff-active hydrogen atoms of components b), c) and d).

The emulsifiers generally include anionic, cationic or neutral low-molecular, oligomeric or polymeric emulsifiers, surfactants or protective colloids, which are used in a preferred quantity of from 5 to 100% by weight, particularly preferred from 10 to 70% by weight, based on the weight of component c), the water.

Examples of anionic low-molecular, oligomeric or polymeric emulsifiers or surfactants include alkali or alkaline earth salts of fatty acids such as, for example, sodium salts of saturated fatty acids having 10 to 21 carbon atoms, sodium salts of unsaturated fatty acids having 12 to 18 carbon atoms, chlorosulfonated or saponified paraffin oils, alkyl ether sulphonates such as, for example, ethers from α-sulpho-ω-hydroxy-polyethylene glycols with, for example, 1-methylphenylethylphenol, nonylphenol or alkyl ethers having 12 to 18 carbon atoms, arylalkyl sulfonates such as, for example, naphthalenesulfonic acid having straight-chain or branched butyl groups or alkyl sulfates such as the sodium salts of long-chain alkyl sulfonates.

Examples of cationic low-molecular, oligomeric or polymeric emulsifiers or surfactants include, for example, the salts of amines carrying long-chain alkane radicals and having 8 to 22 carbon atoms, which have been converted into the ammonium compounds with acids or by alkylation, as well as analogous phosphorus and sulfur compounds.

Examples of nonionic oligomeric or polymeric emulsifiers or surfactants are alkyl polyglycol ethers or esters such as ethoxylated long-chain alcohols with saturated or unsaturated bonds such as, for example, having 12 to 18 carbon atoms, ethoxylated castor oil, ethoxylated (coconut) fatty acid, ethoxylated soybean oil, ethoxylated resin acids, ethoxylated and, optionally, propoxylated butyl diglycol or ethoxylated alkyl aryl ethers such as, for example, ethoxylated straight-chain and/or branched nonylphenol or octylphenol or benzylated p-hydroxybiphenyl. Polyoxyethylene glycols or polyoxyalkylene glycols having a content of polyoxylene segments of at least 20% by weight, preferably at least 30% by weight, may also be used as nonionic emulsifiers.

Compounds which are suitable as emulsifiers or surfactants also include, for example, ethoxylated long-chain alkyl- or alkenylamines; lecithin; conversion products, modified with long-chain isocyanates, from polyethylene glycols and diisocyanates; conversion products of rape-seed oil and diethanolamine; or ethoxylated conversion products from sorbitan and long-chain alkane- or alkenecarboxylic acids.

Finally, the so-called protective colloids are suitable for use as emulsifiers. These include, for example, polyvinyl alcohols or water-soluble cellulose derivatives such as methyl cellulose.

Nonionic emulsifiers are preferred. The polyoxyethylene glycols or polyoxyalkylene glycols having a content of polyoxyethylene segments of at least 30% by weight are particularly preferred.

Catalysts of the type known per se may be used as component d), further auxiliary substances and additives. Suitable catalysts include, for example, tertiary amines such as triethylamine, N-methylmorpholine, N-ethylmorpholine, N,N,N',N'-tetramethylethylenediamine, pentamethyldiethylenetriamine, 1,4-diazabicyclo[2,2,2]octane, N-methyl-N'-dimethyl-aminoethyl piperazine (as described in DE 2,636,787), N,N-dimethyl-benzylamine, N,N-dimethylcyclohexylamine, 2-methylimidazole, monocyclic and bicyclic amidines (as described in DE 1,720,633), bis-(dialkylamino)alkyl ether (as described in U.S. Pat. No. 3,330,782, the disclosure of which is herein incorporated by reference, DE 1,030,558, DE 1,804,361, and 2,618,280) and amide groups (preferably tertiary amines having formamide groups as described in DE 2,523,633 and 2,732,292). Other organometallic compounds, in particular organic tin compounds, may also be used as catalysts. Suitable organic tin compounds, besides sulfur-containing compounds such as, for example, di-n-octyltin mercaptide (DE-AS 1,769,367, U.S. Pat. No. 3,645,927), include, preferably, tin(II) salts of carboxylic acids such as tin(II) acetate, tin(II) octoate and tin(II) laurate, as well as tin(IV) compounds such as, for example, dibutyltin oxide, dibutyltin dilaurate or dioctyltin diacetate. Also, suitable compounds include those of titanium, bismuth and antimony such as, for example, antimony triisopropoxide, antimony octoate, antimontallat, bismuth salts of carboxylic acids having 2 to 20 carbon atoms such as, for example, bismuth trioctanoate, dibutylbismuth octanoate, triphenylbismuth didecanoate and dibutyltitanium bis(acetyl-acetonate).

Some further examples of catalysts that may be used and information on the mechanism of action of the catalysts are described in Kunststoff-Handbuch volume VII, "Polyurethane", edited by Vieweg and Höchtlen, Carl-Hanser Verlag, Munich, 1966, for example, on pages 96 to 102.

The overall quantity of catalysts in the polyurethane ureas according to the invention is usually between approximately 0.003 and 5% by weight; preferably between 0.05 and 2% by weight, based on the total quantity of the total reactive composition of component a) to d).

Suitable auxiliary substances and additives also include, for example, pigments, dyes, flameproofing agents such as, for example, tris(chloroethyl) phosphate, tricresyl phosphate or ammonium phosphate and ammonium pyrophosphate, stabilizers against the effects of ageing and weathering, softeners, lubricants and mold release agents, substances having a fungistatic and bacteriostatic action and fillers such as calcium carbonate, silica gel, barium sulfate, calcium sulfate, kaolin, bentonite, zeolites, ground glass, glass beads, fibers of glass, plastic or carbon, quartz sand or quartz powder, silicon carbide, aluminum trihydrate, chalk, dolomite or mixtures therefrom. Optional further auxiliary substances and additives also include solvents wherein the conversion to polyurethane urea is conducted.

The equivalent ratio of starting component b) to component c) in the polyurethane ureas according to the invention (referring to the starting materials prior to reaction) is preferably between 5:1 and 1:30. For the calculation of the ratio and the optionally used compounds having at least one hydrogen atom capable of reacting with isocyanates and a molecular weight of from 32 to 400 of component d) are added to component b) and are included in the calculation.

The ratio of the isocyanate equivalents of component a) to the sum of the equivalents of zerewitinoff-active hydrogen atoms of component b) and component c) in the polyurethane ureas according to the invention, referred to the starting materials prior to reaction, is preferably less than 1.1:1.

The polyurethane ureas according to the invention may be prepared by a discontinuous process or a continuous process such as, for example, using a multishaft screw extruder. The preparation can be carried out according to the so-called one-shot process, that is, by bringing together the reaction components and then reacting them to form a polymer, or according to the prepolymer process. According to the prepolymer process, the process involves i) preparing a prepolymer from at least portions of the component a) and at least portions of the component b), and ii) reacting this prepolymer together with the rest of the starting materials and the remaining portions of the components a) and b) to form polyurethane urea.

The prepolymer process has the advantage that a majority of the urethane bonds are formed in a prior reaction. The possibility of polyureas being formed that are of low solubility and not linked to the polyurethane segments is thereby circumvented in many cases.

It is in any case important that the water be introduced into the reaction mixture with the aid of an effective quantity of one or more emulsifiers. The mixture of water and emulsifier may be introduced into the reaction mixture separately or combined with other components. Mixtures of water and the isocyanate-containing compounds of the component a) or isocyanate-containing prepolymers are disadvantageous, as this can lead to uncontrolled preliminary reactions.

In a particular variation of the preparation of the polyurethane ureas, the water of component c) together with the emulsifier is introduced discontinuously at temperatures of between 30° C. and 110° C. into the reaction mixture which consists of a prepolymer of components a) and b) and the rest of the starting materials. The reaction to form polyurethane urea is conducted at temperatures of between 50° C. and 110° C.

In a further variation, the preparation of the polyurethane ureas is conducted continuously at temperatures of between 50° C. and 220° C. in a multishaft screw extruder, optionally equipped with kneading elements and with a self-cleaning screw geometry. It is useful to employ screw extruders constructed from several housing parts that can be heated and cooled separately and which are subdivided into intake zones (for introduction of the reaction components), reaction zones and extrusion zones. When carrying out the process according to the invention, either all the components are introduced into the screw extruder at the same point (preferably in the first housing) separately or partly mixed, or they may be introduced continuously at different points (in different housing parts or zones). The water of the component c) together with the emulsifier and optionally premixed with other components is added at temperatures of between 30° C. and 180° C., preferably between 50° C. and 150° C. It is particularly preferred that all of the starting components, except for the water from component c), emulsifier and optional additives, be introduced at the beginning of the screw extruder in the first housing, and that the water from component c), emulsifier and optional additives be introduced into the screw extruder at a point which is located downstream from other starting materials such as, for example, in a different housing part or zone. An advantageous reaction procedure is one which allows the mixture of water and emulsifier to be mixed with the other reaction components in the screw extruder before a significant build-up of the molecular weight has occurred. This can be achieved, for example, by the zone that lies downstream from the charging point of the component c) having a temperature of less than 100° C., preferably less than 80° C.

The polyurethane ureas according to the invention have mechanical properties of a high quality, especially with respect to their elastic properties such as, for example, strain and tensile strength and their thermal properties such as, for example, heat resistance. The polyurethane ureas according to the invention can be used in a conventional manner for the preparation of molded articles, moldings and injection molded parts, thermoformed parts, semi-finished goods, plates, containers, equipment parts, casings, rollers, gearwheels, machine and vehicle parts, cylinders, elastic coatings, films, housings, flexible tubing, catheters, seals, profiles, bearing shells and fibers. They can in general be employed in an advantageous manner wherever thermoplastically processable materials are employed.

The following examples further illustrate details for the present invention. This invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all parts are parts by weight.

EXAMPLES

Materials used:

Polyol A: Polyoxytetramethylene glycol having an average molecular weight (Mn) of 2000 g/mol.

Polyol B: Polyester polyol of hexanediol, neopentyl glycol and adipic acid having an average molecular weight (Mn) of 1700 g/mol.

Polyol C Polyoxytetramethylene glycol having an average molecular weight (Mn) of 1000 g/mol.

Diisocyanate A: Perhydro-4,4'-diphenylmethane diisocyanate in the proportion of 20% by weight of trans,trans-isomer, 50% by weight of trans,cis-isomer, and 30% by weight of cis,cis-isomer.

Diisocyanate B: 4,4'-methylenediphenyl isocyanate.

Example 1

(Polyurethane Urea Based on a Cycloaliphatic Diisocyanate)

1600 g (1.6 hydroxyl equivalents) of polyol A and 419.2 g (3.2 isocyanate equivalents) of diisocyanate A are placed in a 3 l three-necked flask supplied with an internal thermometer, mechanical stirring and an inlet for nitrogen, and stirred at 100° C. under a nitrogen atmosphere until the isocyanate content has fallen to 3.25% by weight. The temperature is lowered to 60° C. and a mixture of 72.0 g of water, 50.0 g of emulsifier (see Table 1 below) and 6.8 g of a 33% by weight solution of 1,4-diaza[2,2,2]bicyclooctane in dipropylene glycol is added. Stirring is carried out for one minute and the reaction mass is cast onto a PTFE film. The reaction mixture is allowed to react in a polythene bag at 70° C. for a total of 48 h.

Examples 2–5 followed the same procedure as described hereinabove for Example 1, except for the specific emulsifier used. Emulsifiers for examples 1–5 are set forth in Table 1 below.

TABLE 1

| Example | Emulsifier |
|---|---|
| 1 | Alkoxylated n-butanol (content of oxyethylene units of 85% by weight, average molecular weight 2250 g/mol) |
| 2 | Ethoxylated nonylphenol having a content of oxyethylene units of 66% by weight, average molecular weight 660 g/mol |
| 3 | 3-benzyl-4-hydroxybiphenylpolyglycol ether |
| 4 | Polyoxyalkylene glycol (content of oxyethylene units of 97% by weight, average molecular weight 600 g/mol) |
| 5 | Polyoxyalkylene glycol (proportion of oxyethylene units 49% by weight, average molecular weight 2000 g/mol |

Example 5

(Injection Molding of Comminuted Polyurethane Urea)

The polyurethane urea from Example 5 is comminuted into granules and dried for 5 hours at 110° C. and molded in a conventional injection molding machine into test pieces measuring 40×6×2 mm in size. The polyurethane urea has the following properties:

Hardness: 71 Shore A

Rebound resilience: 60%

Tensile strength: 27.1 MPa

Elongation at tear: 614%

Tension at 100%: 1.8 MPa

Tension at 300%: 3.2 MPa

Example 6

(Polyurethane Urea Based on a Cycloaliphatic Diisocyanate)

2016 g (2.4 hydroxyl equivalents) of polyol B and 628.8 g (4.8 isocyanate equivalents) of diisocyanate A are placed in a 5 I three-necked flask supplied with an internal thermometer, mechanical stirring and an inlet for nitrogen, and stirred at 100° C. under a nitrogen atmosphere until the isocyanate content has fallen to 3.81% by weight. The temperature is lowered to 60° C. and a mixture of 94.4 g of water, 65.48 g of the same emulsifier used in Example 5 and 8.88 g of a 33% by weight solution of 1,4-diaza[2,2,2] bicyclooctane in dipropylene glycol is added. Stirring is carried out for one minute and the reaction mass is cast onto a PTFE film. The reaction misture is allowed to react in a polythene bag at 70° C. for a total of 48 h. Then the polyurethane urea is comminuted into granules, dried for 5 h at 110° C. and molded in a conventional injection molding machine into test pieces measuring 40×6×2 mm in size. The polyurethane urea has the following properties:

Hardness: 70 shore A

Rebound resilience: 40%

Tensile strength: 28.8 MPa

Elongation at tear: 600%

Tension at 100%: 1.8 MPa

Tension at 300%: 3.5 MPa

Example 7

(Polyurethane Urea Based on a Cycloaliphatic Diisocyanate)

1600 g (3.2 hydroxyl equivalents) of polyol C and 834.4 g (6.4 isocyanate equivalents) of diisocyanate A are placed in a 3 I three-necked flask supplied with an internal thermometer, mechanical stirring and an inlet for nitrogen, and stirred at 100° C. under a nitrogen atmosphere until the isocyanate content has fallen to 5.5% by weight. The temperature is lowered to 60° C. and a mixture of 144.0 g of water, 100.0 g of the same emulsifier used in Example 5 and 8.0 g of a 33% by weight solution of 1,4-diaza[2,2,2] bicyclooctane in dipropylene glycol is added. Stirring is carried out for one minute and the reaction mass is cast onto a PTFE film. The reaction mixture is allowed to react in a polythene bag at 70° C. for a total of 48 h. The polyurethane urea is comminuted into granules, dried for 5 h at 110° C. and plates having a thickness of 2 mm are prepared in a press at a temperature of 180° C. The polyurethane urea has the following properties:

Hardness: 73 shore A

Tensile strength: 24.7 MPa

Elongation at tear: 420%

Relative viscosity of the solution: 2.79 (0.5% by weight in dimethylacetamide)

Example 8

(Polyurethane Urea Based on an Aromatic Diisocyanate)

1250 g (1.25 hydroxyl equivalents) of polyol A and 312.5 g (2.5 isocyanate equivalents) of diisocyanate B are placed in a 3 I three-necked flask supplied with an internal thermometer, mechanical stirring and an inlet for nitrogen, and stirred at 100° C. under a nitrogen atmosphere until the isocyanate content has fallen to 3.36% by weight. The temperature is lowered to 60° C. and a mixture of 90 g of water and 62.4 g of the same emulsifier from Example 5 is added. Stirring is carried out for one minute and the reaction mass is cast onto a PTFE film. The reaction mixture is reacted in a polythene bag at 70° C. After approx. 15 minutes the polyurethane urea can be released and is postcured for 24 h at 70° C. and for 24 h at 110° C. The polyurethane urea is comminuted into granules from which plates of a thickness of 2 mm are prepared in a press at a temperature of 180° C. The polyurethane urea has the following properties:

Hardness: 68 shore A

Tensile strength: 20.3 MPa

Elongation at tear: 930%

Heat resistance from the shear modulus curve: 190° C.

Relative viscosity of the solution: 1.74 (0.5% by weight in dimethylacetamide)

Example 9

(Polyurethane Urea Based on an Aromatic Diisocyanate)

2000 g (2.0 hydroxyl equivalents) of polyol A and 450.0 g (3.6 isocyanate equivalents) of diisocyanate B are placed in a 5 I three-necked flask supplied with an internal thermometer, mechanical stirring and an inlet for nitrogen, and stirred at 100° C. under a nitrogen atmosphere until the isocyanate content has fallen to 2.74% by weight. The temperature is lowered to 60° C. and a mixture of 90 g of water and 62.4 g of the emulsifier used in Example 5 is added. Stirring is carried out for one minute and the reaction mass is cast onto a PTFE film. The PTFE film is hardened in a polythene bag at 70° C. After approx. 15 minutes, the polyurethane urea can be released and is postcured for 24 h at 70° C. and for 24 h at 110° C. The polyurethane urea is comminuted into granules and plates of a thickness of 2 mm are prepared in a press at a temperature of 180° C. The polyurethane urea has the following properties:

Hardness: 66 shore A

Tensile strength: 21.6 MPa

Elongation at tear: 940%

Heat resistance from the shear modulus curve: 187° C.

Relative viscosity of the solution: 1.79 (0.5% by weight in dimethylacetamide)

Examples 10

(Continuous Preparation of a Polyurethane Urea Based on an Aromatic Diisocyanate)

The following are introduced continuously into the hoppers of a conventional screw extruder per unit of time:

A) 2500 g/h of a prepolymer composed of
   a) 4.0 kg (8.0 hydroxyl equivalents) of polyol C,
   b) 1.5 kg (12.0 isocyanate equivalents) of isocyanate B,
   c) 35.1 g of ethylenebisstearylamide and
   d) 3.51 g of 2,6-di-tert-butyl-4-methylphenol having an isocyanate content of 3.0% by weight into the first housing in the screw extruder and B) 250 g/h of a mixture of
   e) 80 parts of water
   f) 40 parts of the emulsifier used in Example 5 into the hopper in the third housing of the screw extruder.

The temperature control is shown in Table 4.

TABLE 4

| Housing    | 1  | 2  | 3  | 4  | 5   | 6   | 7   | 8   | 9   |
|------------|----|----|----|----|-----|-----|-----|-----|-----|
| Example 10 | 70 | 70 | 70 | 70 | 100 | 130 | 170 | 200 | 180 |

After leaving the extrusion die the polyurethane ureas are drawn through a cooling bath (water, 23° C.) and granulated.

The polyurethane ureas have the properties shown in Table 5.

TABLE 5

| Example | Relative viscosity in solution*) | Hardness Shore A | Tensile Strength in MPa | Elongation at tear in % |
|---------|----------------------------------|------------------|-------------------------|-------------------------|
| 10      | 1.67                             | 70               | 16.3                    | 720                     |

*) 0.4 percent in N-methylpyrralidone

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition comprising a polyurethane urea prepared by reacting a mixture comprising a) at least one polyisocyanate, b) at least one compound having a number average molecular weight of 400 to 10,000 and on average at least 1.8 Zerewitinoff-active hydrogen atoms and c) water, wherein water is introduced into said mixture along with an effective amount of at least one emulsifier, said polyurethane urea having a solid content of at least 70% by weight.

2. The thermoplastic polyurethane urea of claim 1, wherein said emulsifier comprises a polyoxyalkylene containing at least 20% by weight of oxyethylene units and having at least one hydroxyl group.

3. The thermoplastic polyurethane urea of claim 1, wherein the equivalent ratio of component b) to component c) is between 5:1 and 1:30.

4. The thermoplastic polyurethane urea of claim 2, wherein the ratio of the isocyanate equivalents present in said component a) to the sum of the total equivalents of Zerewitinoff-active hydrogen atoms present in said components b) and c) is less than 1.1:1.

* * * * *